Dec. 13, 1938.  R. M. C. GREENIDGE  2,140,154
INDUCTIVE DEVICE
Filed May 8, 1936

INVENTOR
R. M. C. GREENIDGE
BY
ATTORNEY

Patented Dec. 13, 1938

2,140,154

UNITED STATES PATENT OFFICE 2,140,154

INDUCTIVE DEVICE

Ralph M. C. Greenidge, Chatham, N. J., assignor to Bell Telephone Laboratories, Incorporated, New York, N. Y., a corporation of New York Application May 8, 1936, Serial No. 78,583

2 Claims. (Cl. 178—46)

The present invention relates to communication lines and more particularly to inductive loading equipment for communication lines.

An object of the present invention is an improvement in inductive loading equipment for communication lines.

A further object of the present invention is the provision of a buried communication line having loading adapted for use in the ground and requiring a minimum of maintenance expense.

A feature of the present invention is a rugged conductor cable of rubber covered wire designed to be laid underground, for example, with a trenching machine, combined with a load coil and casing or housing of sturdy construction incorporated into the cable and designed to be laid underground with the cable.

Figure 1:
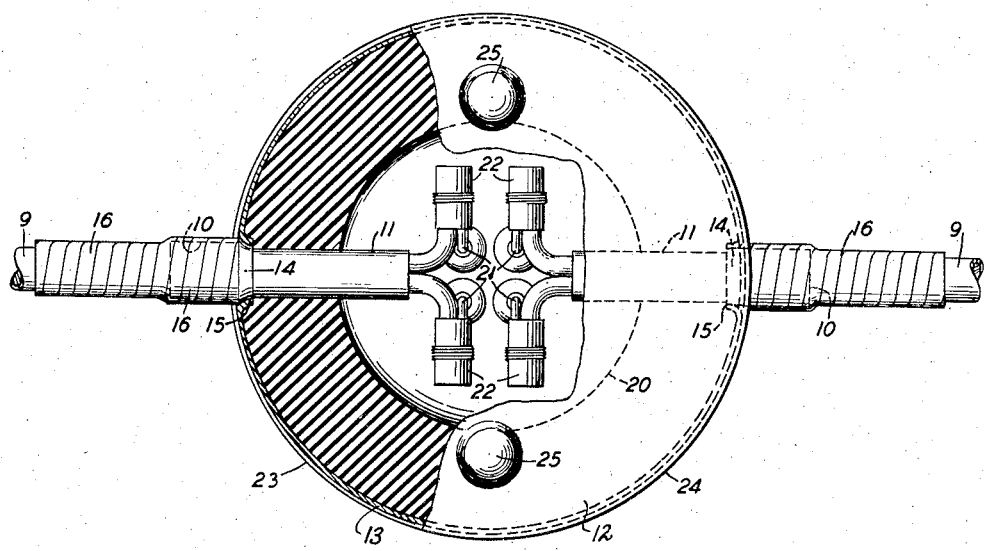
Figure 2:
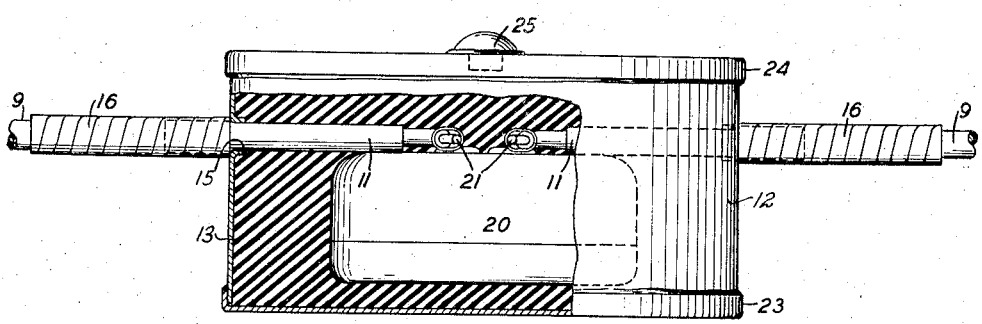

Further objects and advantages or features of the present invention will appear from the disclosure in the accompanying specification of an illustrative embodiment of the invention as shown in the accompanying drawing in which:

Fig. 1 shows a plan view partly in section of the loading coil casing connected into a rubber covered cable forming a communication line; and Fig. 2 shows an elevation partly in section of the loading coil casing and its connection into the communication line.

The communication cable 9 illustrated, consists of a rubber covered pair of wires vulcanized into a smooth conductor oval in cross-section and of rugged construction. The end of the cable to be connected to the loading coil structure is connected by vulcanization to a similar piece of cable enclosed within a copper sleeve 10 also oval in cross-section. A portion 11 of the copper sleeve 10 is rolled down tightly on to the rubber covered cable pair or stub cable to grip the cable firmly and to insure a water-tight joint with the end of the cable projecting from the sleeve. The reduced portion 11 of the copper sleeve joins the undistorted portion of the sleeve in a shoulder 14 of smoothly rounded configuration. A loading coil casing container or housing 12 has cylindrical side wall 13 punched inwardly on diametrically opposite sides to form two perforations each the shape and size of the reduced end of the copper sleeve. The housing 12 is of durable material such as of heavy gauge copper, tinned for additional resistance against corrosion. The sleeve 11 is inserted within the casing 12 until the shoulder 14 fits snugly against an inwardly rolled edge 15 of the perforation in the side wall 13 of the casing 12. This shoulder 14 is secured against the rolled edge 15 of the perforation by soldering or sweating into place. The sleeve is thus retained in place against any severe pull and in turn it holds the cable against any possibility of movement in a firm grip in the reduced portion 11. A similar cable connection enters the loading coil casing through the opposite side of the cylindrical wall 13 of the casing. The two opposed copper sleeves terminate somewhat short of the middle of the loading coil casing 12.

Servings 19 of water-proofing tape or the like cover portions of the sleeves 10 and cables 9 and constitute a stiff protecting covering extending from the side wall of the casing 12 over each copper sleeve 10 and out over the adjacent portion of the rubber covered conductor cable 9 for a suitable distance. These wrappings lend a sufficient degree of stiffness to the rubber covered cable adjacent the place of entering the copper sleeve to prevent cutting through the insulation on the cable at the edge of the copper sleeve and to reduce the risk of breaking or injuring the cable on the edge of the copper sleeve.

A small loading coil casing 20 is rigidly soldered to corresponding flat sides of the copper sleeves 11 and is thereby mounted in proper predetermined position within the outer housing 12. This casing 20 which encloses the loading coil (not shown) may be a box of relatively thin metal. The loading coil casing 20 is impregnated with a heavy and stiff water-proofing compound forced hot through a suitable perforation in the casing which is then closed by solder or in other suitable manner. The case is completely tinned or soldered for its protection.

The loading coil within the casing 20 has its four terminal wires patched or otherwise connected to four lead wires 21 which are brought outside of the loading coil box through glass bead seals of the type disclosed in Ronci case 50, Serial No. 62,252, filed February 4, 1936. The end of each conductor pair of the cable 9 is split centrally through the body of the rubber insulation between the copper conductors and each wire fastened to the proper lead wire 21. The connection employed is to twist the lead wire 21 around the copper conductor of the cable associated therewith and slide an oval cap 22 of insulating material over the joint followed by securing the oval cap in place as by tying.

The completed outer loading coil housing 12 consists of the cylindrical side wall 13 closed by a heavy cap 23 soldered thereon. The outer casing while preferably of a heavy gauge of sheet copper tinned for its protection against the natural corrosive substances in the soil may be of any material suitable to any special use or conditions. The assembled casing 12 is closed by a copper cap member 24 also tinned and soldered in place. The cap 24 has two perforations for permitting a complete filling of the chamber surrounding the loading casing 20 with a heavy water-proofing compound adapted to be put in hot. The two perforations are later stopped with plugs or rivets 25 both of which are soldered securely in place in a manner to close and seal the chamber after cooling and complete impregnation. The entire outer casing receives a heavy coating of pitch which is applied to the servings 16 as well to protect the loading coil structure from deterioration in the soil.

It is to be understood that the connections into the loading coil housing may be made at one point instead of from opposite sides. Then the housing may be disposed at a point distant from the line of the cable. Other changes may be made in the details of this disclosure without departure from the spirit of the invention.

What is claimed is:

1. A loaded communication cable comprising a rubber covered conductor cable open for insertion of a loading coil assembly, an outer housing for holding the loading coil, perforations in the opposite side walls of the outer housing entered by the cable ends, a lip turned inwardly at each perforation forming an embossed reinforcement at each perforation, a metallic sleeve telescoped over the ends of each cable section with a portion of cable projecting from the sleeve and with the sleeve rolled down tightly on to the cable, a metallic joint between each sleeve and the adjacent lip reinforcing the perforation in the side of the housing, a metallic loading coil casing disposed substantially centrally within the outer casing, a rigid connection between the inwardly disposed loading coil casing and each sleeve, a loading unit within the casing, lead wires from the terminals of the loading unit extending outwardly of the casing and sealed thereinto to prevent entry of moisture within the casing, and connections between the conductors of the respective cable ends and the proper lead wires from the loading coil.

2. A loaded communication cable comprising a rubber covered conductor pair cut for insertion of a loading coil assembly, an outer housing for holding the loading coil, oval perforations in the opposite sides of the outer housing for entry of the cable ends, a lip turned inwardly at each perforation forming an inwardly rounded edge to each perforation, an oval copper sleeve telescoped over the end of each cable section with a portion of the cable section projected therefrom, the sleeve being rolled down tightly on to the cable from the outer end through a portion of the length of the sleeve forming a tight joint between the sleeve and the cable and a smoothly rounded shoulder between the reduced and unreduced portions of the sleeve, a soldered connection between the shoulder of the sleeve and the lip at each perforation, a metallic loading coil casing disposed substantially centrally within the outer casing and soldered rigidly to both sleeves, a loading unit within the casing, lead wires from the terminals of the loading unit extending outwardly of the casing and sealed thereinto, and electrical connections between the conductors of the respective cables and the lead wires from the loading unit within the casing.

RALPH M. C. GREENIDGE.